United States Patent [19]
Dimmick et al.

[11] Patent Number: 5,604,442
[45] Date of Patent: Feb. 18, 1997

[54] CONTAINER INSPECTION APPARATUS HAVING DIAMETER MEASURING MEANS AND ASSOCIATED METHOD

[75] Inventors: Henry M. Dimmick, Butler; Mark F. Zanella, Sr., Cranberry Township; Thomas F. Melnik, Butler, all of Pa.

[73] Assignee: AGR Internatonal, Inc., Butler, Pa.

[21] Appl. No.: 603,125

[22] Filed: Feb. 20, 1996

Related U.S. Application Data

[62] Division of Ser. No. 330,323, Oct. 27, 1994, Pat. No. 5,532,605.

[51] Int. Cl.$^6$ ................................................. G01R 35/00
[52] U.S. Cl. ........................... 324/671; 324/687; 324/688; 324/690; 209/524
[58] Field of Search .................................. 209/524, 527, 209/529; 324/671, 687, 688, 690

[56] References Cited

U.S. PATENT DOCUMENTS

| | | |
|---|---|---|
| 2,573,824 | 11/1951 | Baker . |
| 3,779,378 | 12/1973 | Scherf . |
| 4,259,571 | 3/1981 | Dubberly . |
| 4,414,566 | 11/1983 | Peyton et al. . |
| 4,557,386 | 12/1985 | Buckley et al. . |
| 4,820,972 | 4/1989 | Scott et al. . |
| 4,862,062 | 8/1989 | Baker et al. . |
| 4,870,342 | 9/1989 | Scott . |
| 4,930,364 | 6/1990 | Baker et al. . |
| 4,965,523 | 10/1990 | Baker et al. . |
| 4,972,566 | 11/1990 | Andersen et al. . |
| 5,097,216 | 3/1992 | Dimmick et al. . |
| 5,175,505 | 12/1992 | Magenau ................................ 324/687 |
| 5,223,796 | 6/1993 | Waldman ................................ 324/687 |

Primary Examiner—Maura K. Regan
Assistant Examiner—Jose M. Solis
Attorney, Agent, or Firm—Arnold B. Silverman; Eckert Seamans Cherin & Mellott

[57] ABSTRACT

Apparatus for inspecting non-round annular containers includes elongated capacitive sensors, cooperating oscillators, which convert the sensor signal to a voltage corresponding thereto, and an electronic processor which receives the voltage and determines thickness. A displaceable electromechanical member is operatively associated with the sensor and emits an electrical signal corresponding to the degree of displacement of the sensor by a container being inspected. The electronic processor corrects the thickness determination by an adjustment of container diameter at the specific location where thickness is being monitored in order to compensate for container diameter variations due to the non-round characteristic of the container. In a preferred embodiment, linkage members secured to the rear of the sensor at a plurality of locations cooperate with a single displaceable element which converts the mechanical displacement of the sensor into a corresponding electrical signal. Movement between the capacitive sensors and the apparatus urging the containers into intimate contact therewith to accommodate variations in container diameter, while maintaining intimacy of sensor-container contact, is provided. The sensors and/or apparatus for urging the containers into intimate contact may be resiliently mounted. In one embodiment, sensors may be placed on both sides of the path of travel of the container which will have its diameter monitored on both sides thereby permitting rotation of the container against the sensors through 180° rather than 360°. A corresponding method is provided.

20 Claims, 9 Drawing Sheets

CONTAINER INSPECTION APPARATUS HAVING DIAMETER MEASURING MEANS AND ASSOCIATED METHOD

This is a continuation, division, of application Ser. No. 08/330,323, filed Oct. 27, 1994 now U. S. Pat. No. 5,532,605.

BACKGROUND OF THE INVENTION

1. Field of the Invention

The present invention relates to a system for measuring the wall thickness of generally oval shaped containers and, more specifically, includes means for adjusting the thickness measurement for changes in diameter resulting from the non-round nature of the container. The invention also relates to measurement of container diameters.

2. Description of the Prior Art

It has long been known, with respect to containers, such as glass and plastic bottles and jars, to inspect the same for compliance with various specifications, such as shape, dimensions, wall thickness, and any other departures from the specified parameters. In connection with such inspection, it has been known to use a sampling technique wherein periodically a sample container is removed from the production line and inspected. For glass containers, the measurement of thickness, for example, has been accomplished by hand-held capacitive or ultrasonic thickness measuring instruments. In the alternate, destructive testing as by taking a sample and cutting it into pieces with subsequent mechanical measurement has also been known. While such sampling techniques can provide accurate measurements, they suffer from the disadvantage of using samples and the need to make statistical inferences based upon the results of such sampling. As every container is not inspected, it is possible that a number of defects will go undetected. This can result not only in loss of the container, but loss of the product to be placed in the container and, perhaps, injury to the consumer or other user.

It has been known to employ capacitive means for automatically inspecting wall thickness of containers made of dielectric materials with inspection of each container, as distinguished from sampling techniques, being employed. See, generally, U.S. Pat. Nos. 2,573,824; 4,820,972; 4,862,062; 4,870,342; 4,930,367; 4,965,523; and 4,972,566. It has also been known, in such a context, to provide a plurality of sensors which cooperate with oscillator means to produce an output voltage responsive to capacitance changes which voltage is employed to determine container wall thickness. See, for example, U.S. Pat. Nos. 4,862,062; 4,870,342; 4,965,523; and 4,972,566.

It has also been known to provide such a system wherein a plurality of containers rotating by and being urged into intimate contact with a plurality of sensors may be inspected simultaneously. See U.S. Pat. No. 5,097,216 which is owned by the assignee of the present application.

These prior systems were directed toward inspecting round containers made of a dielectric material. When non-round annular containers, such as oval containers, for example, are to be inspected, these systems are not readily applicable.

There remains, therefore, a real and substantial need for an automated means of rapidly inspecting dielectric containers which have a generally oval configuration.

SUMMARY OF THE INVENTION

The present invention has met the above-described need by providing a system wherein elongated capacitive sensor means serve to provide output signals which are converted into voltage signals and, ultimately, a thickness reading and corresponding mechanical means serve to deform a displaceable element responsive to a container deforming the sensor means so as to provide a voltage signal which may be employed to determine diameter changes and provide a corresponding correction for a thickness reading related to the diameter of the container at the position where thickness has been measured.

In a preferred practice of the invention, a linkage means will be secured to the rear of the sensor means and be associated with a transducer which will be displaced responsive to container induced deformation of the sensor means. The transducer output is employed to provide information from which the container diameter is determined. The diameter provides a means for adjusting the wall thickness reading.

In a preferred practice of the invention, the sensor means will emit a signal which will be converted to a corresponding voltage signal related to thickness by oscillator means which voltage signal will be received by electronic processor means, which makes a comparison of the measured thickness with stored, desired thickness values and determines whether the desired thickness is present. The displaceable diameter indicating means, such as a transducer, also emits a signal which is received by the electronic processor means and a determination of diameter variations is made which provides a correction factor for the thickness value.

If desired, a plurality of elongated individual sensor means may be employed.

A look-up table may be provided in the electronic processor means for determining the thickness correction factor to be employed for a particular displacement of the transducer.

In another embodiment, sensor means may be positioned on both sides of the path of travel of the container and rather than having the container rotate through 360° so as to permit substantially continuous determination of diameter and thickness about the circumference of the container, each sensor means may be employed to determine approximately 180° of measurement in the aggregate thereby minimizing the amount of rotation of the container required.

A corresponding method is provided.

It is an object of the present invention to provide apparatus and an associated method for efficiently measuring the wall thickness of dielectric containers which are of non-round shape.

It is another object of the present invention to effect such inspection in an automated rapid fashion which permits inspection of each container as distinguished from employing a sampling technique.

It is a further object of the present invention to measure diameter changes by mechanical movement of linkage means secured to the rear of the sensor means which emits a responsive electrical signal to be processed by the electronic processor means so as to adjust the thickness measurement for diameter changes where desired.

It is a further object of the invention to provide such a system which is compatible with existing capacitive sensor measurement of wall thickness of dielectric containers.

It is a further object of the invention to provide a system which provides rapid on-line real time measurements of container thickness compensated for changes in diameter on non-round annular containers.

It is a further object of the present invention to provide a system for measuring container diameters to detect variations therein.

It is a further object of the invention to provide such a system which can function with a single displacement receiving means which moves responsive to container deformation of the sensor regardless of where the container is positioned on the sensor.

These and other objects of the present invention will be more fully understood from the following description of the invention with reference to the illustrations appended hereto.

DESCRIPTION OF THE PREFERRED EMBODIMENTS

Figure 1:
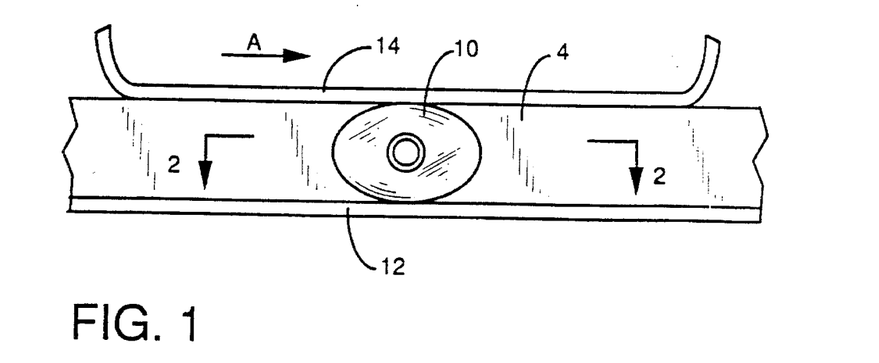
FIG. 1 is a top plan view of a container moving both translationally and rotationally along the apparatus of the present invention.

Referring to FIG. 1, there is shown a portion of an inspection system usable in the present invention. The system has inspection station with a conveyor 4 moving a generally oval shaped container 10 to be inspected translationally in the direction of the arrow A. The container 10 is moved translationally and is also subjecting it to axial rotation by driven belt 14 which also serves to urge the container 10 into intimate contact with capacitive sensor means 12. It will be appreciated that the capacitive sensors means 12, in a manner to be discussed in detail hereinafter, take readings either (a) at predetermined intervals or (b) continuously as the container rotates thereagainst in order to monitor wall thickness about substantially the entire circumference of container 10. It will be appreciated that with oval containers, as they are subjected to axial rotation, the effective diameter of the portion in contact with the sensor means 12 will vary. It is necessary to compensate for variance in order to avoid distortion of the thickness reading due to such diameter variations.

As used herein, the term "non-round annular" containers will refer to containers having the portion which is being inspected not of round configuration and yet being annular in the sense of not having corners that would interfere with rolling action of the containers, such as would occur with containers which are rectangular, triangular or polygonal. It will expressly embrace oval-shaped containers and other non-round containers capable of rolling along the sensing means for sequential inspection thereof.

Figure 2:
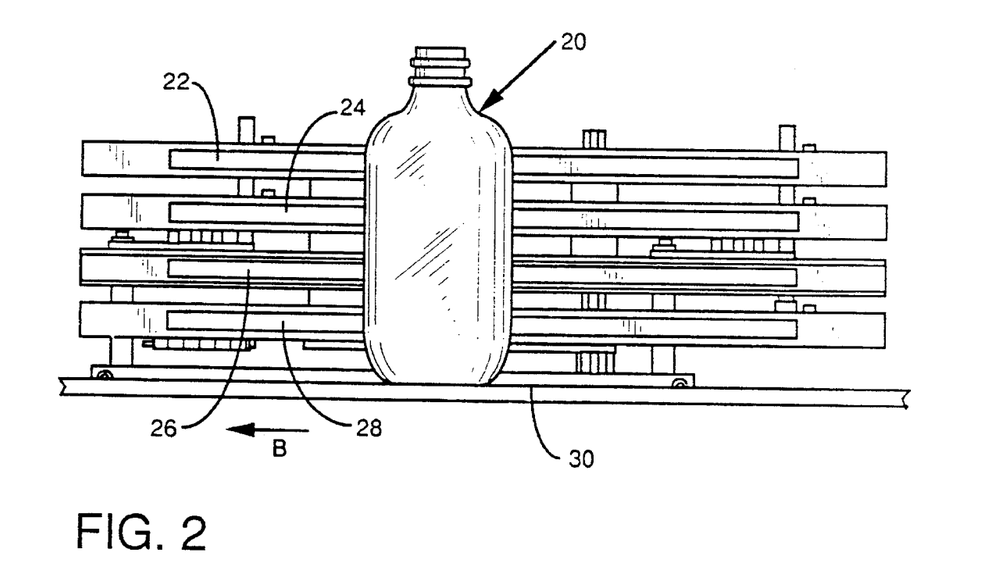
FIG. 2 is a front elevational view showing the sensor means and a container in contact therewith.

Referring now to FIG. 2, additional details of the invention will be considered. In this embodiment, the container 20 is shown as a glass or plastic bottle, although it will be appreciated that the invention may be employed with other dielectric containers, such as jars, for example.

The container 20 is moving in the direction indicated by arrow B and is being urged into intimate contact with the sensor means, which in the form shown, consists of four elongated sensors 22, 24, 26, 28 which are generally parallel to each other, extend along the direction of movement of container 20, and are relatively vertically spaced from each other. They also have their surfaces closest to the container 20 in generally aligned position with respect to each other. As the container 20 moves rotationally and translationally in the direction of arrow B and is urged into intimate contact with the sensors 22, 24, 26, 28, readings will be taken at each of the four levels containing the sensors 22, 24, 26, 28. The container is being transported on conveyor 30. It will be appreciated that as the container progressively rotates on the sensors 22, 24, 26, 28, the capacitance will change with the resultant voltage output corresponding thereto.

Figure 3:
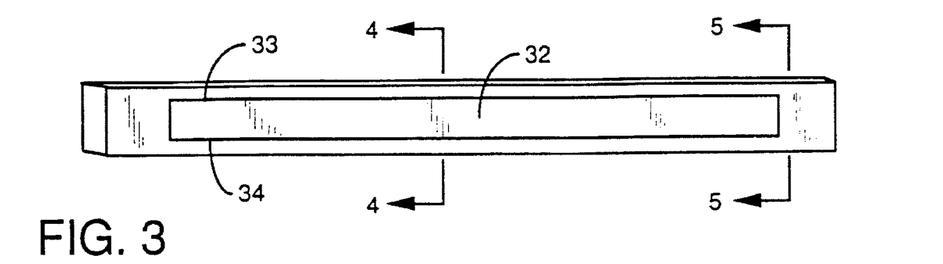
FIG. 3 is a partially schematic illustration of a sensor of the present invention.
Figure 4:
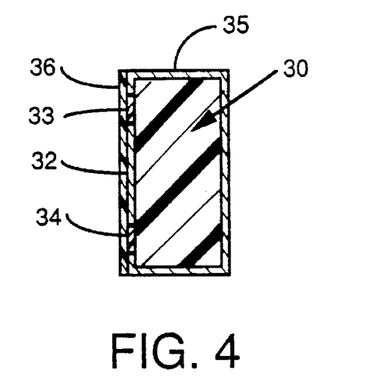
FIGS. 4 and 5 are respectively cross-sectional illustrations taken through FIGS. 4—4 and 5—5 of FIG. 3 showing portions of the sensor means.
Figure 5:
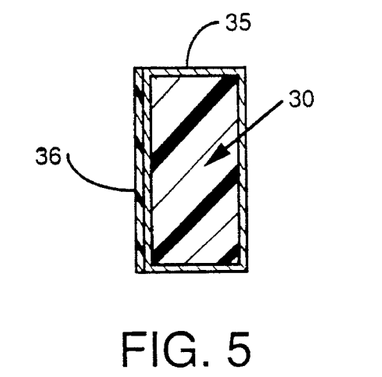

Referring to FIGS. 3 through 5, details of a sensor will be considered. The sensor 30 has a sensor strip 32 which, in the form shown, may be composed of a dielectric material, such as a polyolefin, such as polypropylene, for example. On the face of the sensor 32 is the sensing area which will be in contact with the container being inspected. As shown in FIG. 4, the region of the sensor strip 32 has an electrically conductive surface, such as by applying an electrically conductive paint of a thickness of about 0.002 to 0.005 inch as by silk screening or spraying. As shown in FIGS. 4 and 5, the sensor 30, which may be a block of a suitable dielectric material, has sensor area 32 covered with an electrically conductive material and is surrounded by an uncoated region which is a dielectric frame surrounding sensor element 32. Upper and lower portions 33, 34 of this dielectric frame are shown in FIG. 4. The remainder of the surface of sensor 30 is also coated with an electrically conductive material which is indicated generally by reference number 35. In this manner, sensor 32 serves as one plate of the capacitor and coated region 35 serves as the other plate of the capacitor. The sensor 30 has an overlying tape member 36 which is adapted to resist sensor wear on the front face which contacts the container. The tape member 36 may be made of a suitable dielectric material which is sufficiently thin as to not interfere with the functioning of the sensor area. In FIG. 5, there is shown a cross-section of the sensor in a region which is entirely coated with the conductive layer 34. The sensor area 32 is not present in this area.

Figure 6:
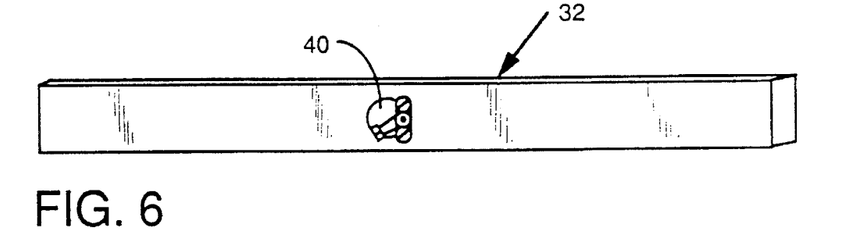
FIG. 6 is a rear elevational view of the sensor of FIG. 3.
Figure 6A:
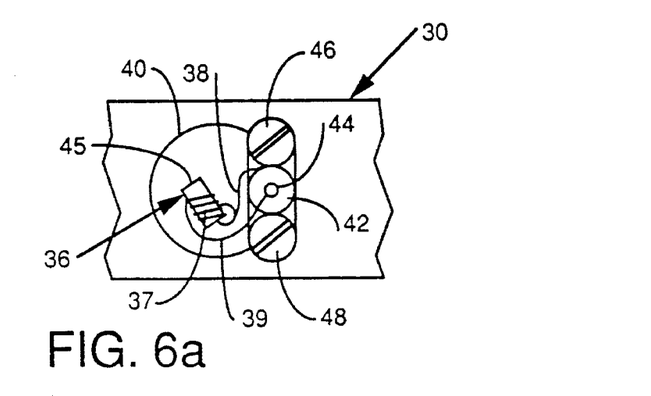
FIG. 6a is a detail showing the electrical connector portion of the sensor.

FIGS. 6 and 6a shows the reverse side of sensor 32 and shows the recess 40 in the reverse side of sensor 30 which contains the electrical contacts for transmitting the output of sensor 30 to the other processing means in the system. In order to minimize the weight of the sensor 30, the inductor 36, which is part of the tuned circuit, is positioned within recess 40 and electrically connected by a suitable cable to the oscillator electronics which are not mounted on the sensor 30. The inductor 36 has coils 37 and is connected as an autotransformer. One lead of the primary coil and one lead of the secondary coil are secured to the oscillator cable connector 42 by leads 38, 39, respectively. Lead 39 is connected to the inner insulated contact 44 of connector 42. Lead 45 of inductor 36 is connected to sensor strip 32. The oscillator cable connector 42 through fasteners 46, 48 are electrically connected to the larger painted area 35. In this manner, changes in capacitance caused by container inspection will be transmitted through oscillator cable connector 42 to the oscillator electronics for conversion to corresponding voltage signals.

Figure 7:
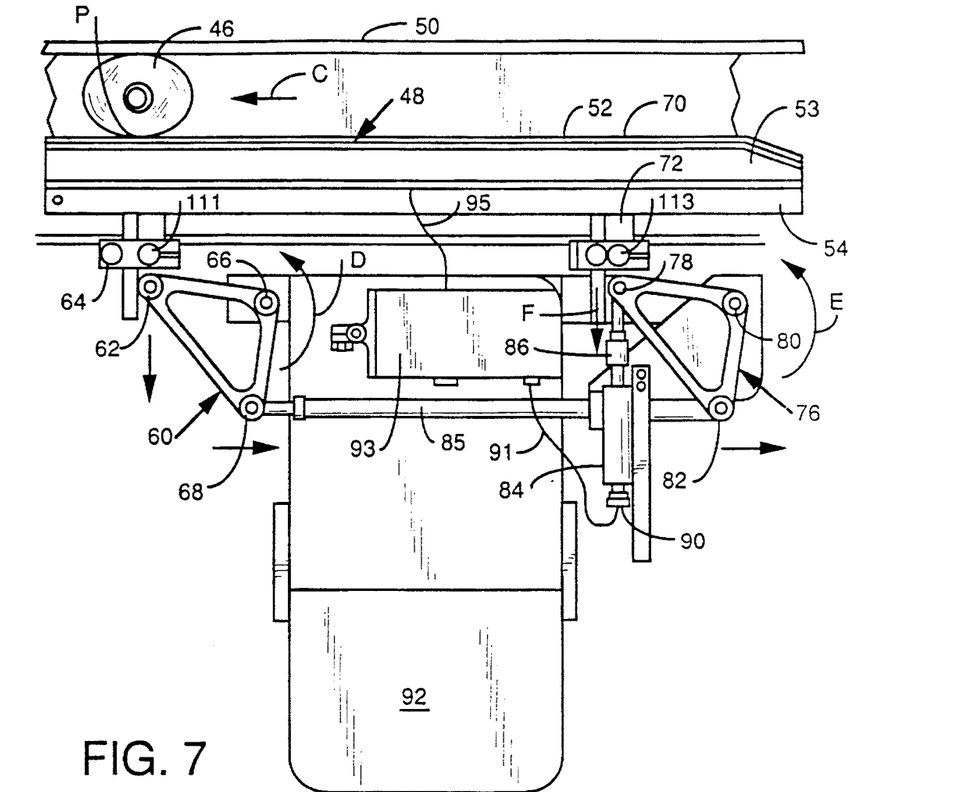
FIG. 7 is a top plan view of a form of apparatus of the present invention.
Figure 8:
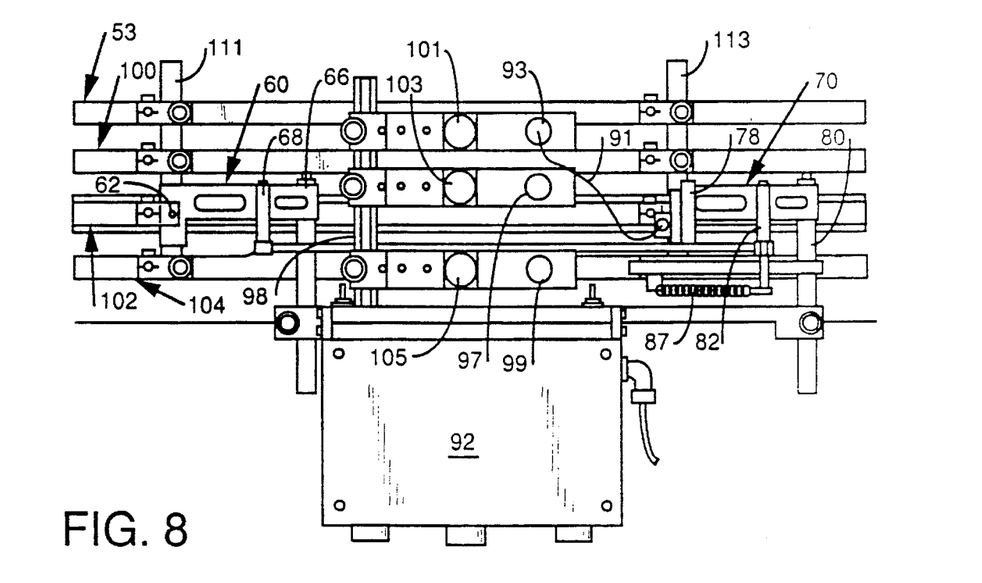
FIG. 8 is a rear elevational view of the apparatus shown in FIG. 2.

Referring to FIGS. 7 through 11, additional details of the preferred embodiment of the invention will be considered. Referring in greater detail to FIG. 7, there is shown an oval container 46 being urged into contact with capacitive sensor means 48 by belt 50. The container is traveling in the direction indicated by arrow C. In this embodiment, the sensor means 48 consists of four sensor elements with only the uppermost sensor 53 shown in this view. This sensor 53 has a sensor strip 52 which is on the front face of sensor 53 and is in contact with the container 46 and a back-up bar 54 which is secured to the sensor 53 through resilient foam. It is desirable to have the sensor assembly 52, 53, 54 be relatively lightweight and flexible. Secured to back-up bar 54 is a pivotable linkage member 60 which is secured through suitable pivot pin 62 to connector member 64 which connects the same to back-up bar 54. Fastener 66 of the linkage member 60 which, in the form shown, is generally triangular, serves as a pivot for the linkage member 60. Fastener 68 is rotatable responsive to rotational movement of the linkage bar 60. In the form illustrated, if the container 46 were to have an enlarged diameter portion come in contact with the sensor means 48, at point P illustrated on the sensor 53, it would tend to deform the sensor means 48 in a direction generally downwardly with respect to FIG. 7. This, in turn, would cause counter-clockwise rotation of the linkage means 60 in the direction indicated by arrow D.

Referring to sensor region 70 which is located upstream in respect of the direction of travel of container 46, attached thereto is a support bracket 72 which is secured to back-up bar 54. Linkage member 76 is, in the form shown, generally triangular in shape and has a pivot pin 78 securing the same to bracket 72, a pivotal fastener 80, which is secured to a support member, and a fastener 82 which secures the linkage to linkage bar 85 which connects linkage element 60 and 76.

It will be appreciated that when the container 46 deforms the sensor 52 in a direction generally downwardly of the page, as shown in FIG. 7, the counter-clockwise rotation of linkage element 60 about pivot 66 will create similar counter-clockwise rotation of linkage element 76 about pivot 80 in the direction indicated by arrow E. A displacement monitor 84 which, in the form indicated is a transducer, has a movable element 86 secured to linkage member 76 through pivot pin 78. In the example given, therefore, an enlarged diameter portion of container 46 would deform the sensor 52 establishing counter-clockwise rotation of linkage element 60 and through linkage connector 85 would create responsive counter-clockwise rotation of linkage element 76 which, in turn, would move the piston element 86 of displacement means 84 generally downwardly in the direction indicated by arrow F. In the preferred embodiment, the displacement means 84 will be a transducer which will emit an electrical signal which corresponds to the degree of mechanical movement over lead 90 by lead 91 to oscillator means 93 which is an oscillator circuit board within a housing. An oscillator cable 95 connects sensor 53 through connector 42 (FIG. 6a) to oscillator means 93. Each sensor will have a similar connector to oscillator means 93. The oscillator means 93 contain all of the oscillator components except for the tuned circuit inductor and capacitor (FIG. 6a). A separate oscillator means 93, 97, 98, 99 (FIG. 8) is provided for each sensor 53, 100, 102, 104. Cable means connect each oscillator means 93, 97, 98, 99 to the electronic processor means through cables connected to contacts 101, 103, 105 (one not shown) with an interposed analog-to-digital converter and multiplexer contained in a separate enclosure (not shown in FIG. 8). The transducer may be electrically connected to any one of the oscillators 93, 97, 98. In a manner to be described in detail hereinafter, this electrical signal will be employed in compensating a thickness reading so as to adjust for diameter changes.

Similarly, still referring to FIG. 7, if the container were at position 70 on sensor 52 and were to deform the same, this would create counter-clockwise rotation of linkage means 76 which would move transducer element 86 downwardly in the direction of arrow F. It will be appreciated, therefore, that by use of this linkage means, deformation regardless of where it occurs along sensor 52 will be properly converted to a corresponding electrical signal reflective of a change in container diameter. It will be appreciated that another beneficial aspect of the invention is that a single displacement monitoring means, such as transducer element 86, can function through the mechanical linkage to provide for compensating diameter change data on a non-round annular container regardless of the position of the container with respect to the sensor.

FIGS. 8 through 11 show additional details of the illustrated system which contains four sensors 53, 100, 102, 104. Each sensor 53, 100, 102, 104 has a back-up bar, such as 54, for example. The back-up bars are fixedly secured to posts 111, 113 (FIGS. 7–11). As a result, when one of the sensors is displaced by a container, all of the sensors will move in unison and cause responsive movement of linkage elements 60, 76, 85 and transducer 84.

The sensors 52, 100, 102, 104 function through a capacitance change providing a signal which alters the frequency of an oscillator circuit. The circuit has two frequency determining components, i.e., capacitance as presented by the sensor means and inductance which is provided by an inductor of fixed value. The sensor means function as plates of the capacitor with the glass of the container acting as the dielectric. The capacitor and inductor form a tank circuit whose natural resonant frequency is determined by the value of these components. As the capacitance of the sensor means changes due to variations in wall thickness of the glass, a new resonant frequency results. This shift in frequency is related to the amount of change in glass thickness. It is desirable that the mass of the sensor means be kept as low as possible in order to permit the sensor assembly to be displaced in a rapid manner responsive to changes in contour of the non-circular container. Combining to contribute to this desired objective is selecting a suitable sensor means thickness which preferably may be 0.250 to 0.350 inch. An appropriate sensor means material which may, for example, be polypropylene or polycarbonate and a suitable resilient back-up material which may be urethane foam. It is also desirable that only the minimum necessary oscillator components be placed on the sensor means. A flexible cable connects the sensor to the rest of the oscillator. In this design, therefore, only the capacitor and inductor are contained in the sensor and the connecting cable need not be part of the tuned circuit. This eliminates the need for critically calibrated cables and makes the circuit substantially immune to problems with movement or tolerances of the cable. This results in improved accuracy and reliability of the measurements.

The linear position sensor or displacement monitoring means 84 (FIG. 7) monitors change of position in one of the sensors. This change is directly proportional to changes in diameter of the container being inspected.

As shown in FIG. 7, oval container 46 is positioned with its major axis parallel to the direction of container translation (arrow C) with belt 50 and sensor 52 in intimate contact with opposite sides of the container 46. As the container 46 is rotated axially, it will be necessary to increase the spacing between belt 50 and sensor 52 in order to accommodate the enlarged transverse dimension of the container. Means such as spring means may be provided to permit resilient displacement of the belt 50 or sensor 52 while preserving the desired intimacy of contact between the container 46 and the adjacent belt 50 and sensor 52. A preferred way of accomplishing this is to provide a spring or springs on the sensor assembly so as to permit movement of the sensor 52 transversely to the direction of travel (arrow C) of the container 46. For example, an extension spring, such as spring 87 (FIG. 8) will be in contact with pivot pin 82 such that in its unflexed position, the sensor 52 will be in the position shown in FIG. 7 with the minor axis of the container transverse to the path of container travel. The spring 87 will normally keep the sensors in its closest relationship with respect to the belt 50 and will be urged transversely outwardly as the container rotates axially to position larger diameter portions in contact with the sensors.

It will be appreciated that an oval container, such as an elliptical container, cannot be the subject of simple measurement across either the minor or major axis in order to determine diameter. The electronic processor means which may be a suitable microprocessor programmed in a manner which will be well known to those skilled in the art, employs an equivalent diameter for calculating correction factors to be applied to the measured wall thickness of the container. The formulas are based upon the approximate cross-section of the container.

Figure 9:
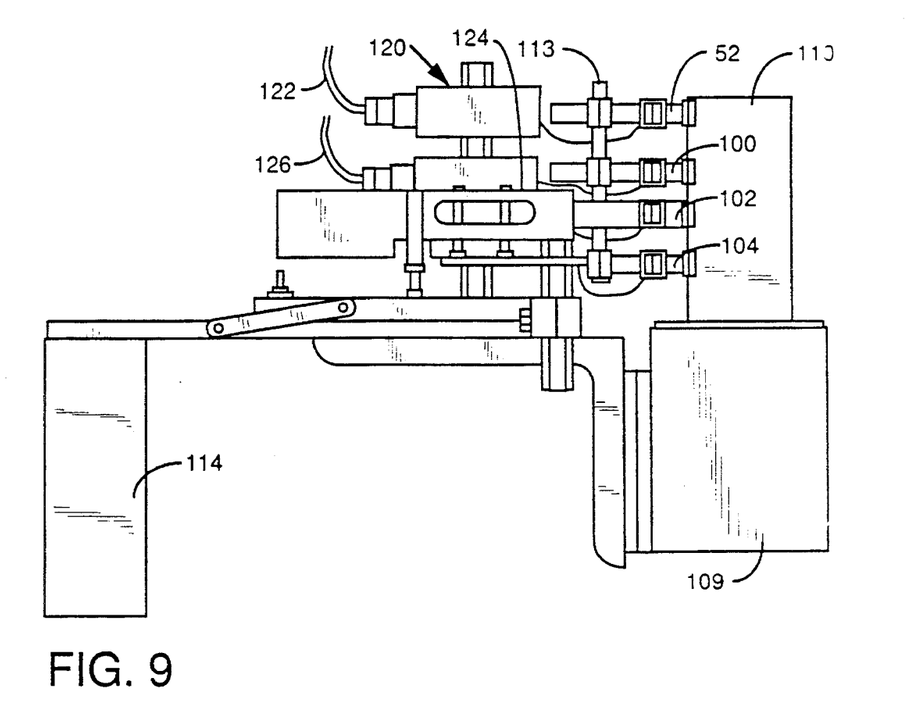
FIG. 9 is a left-side elevational view of the apparatus shown in FIG. 2.
Figure 10:
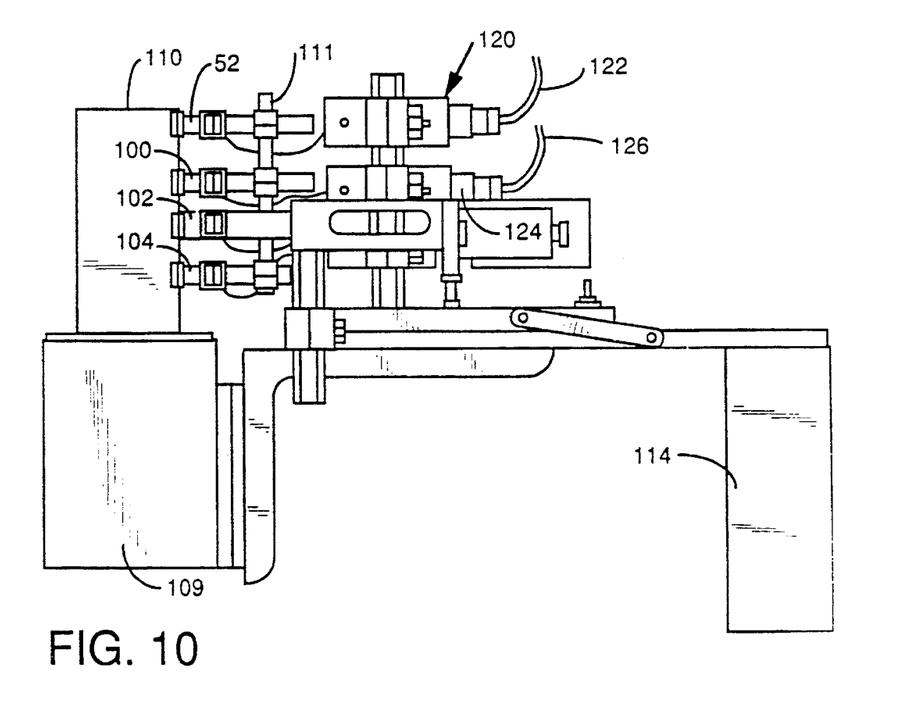
FIG. 10 is a right-side elevational view of the apparatus shown in FIG. 2.
Figure 11:
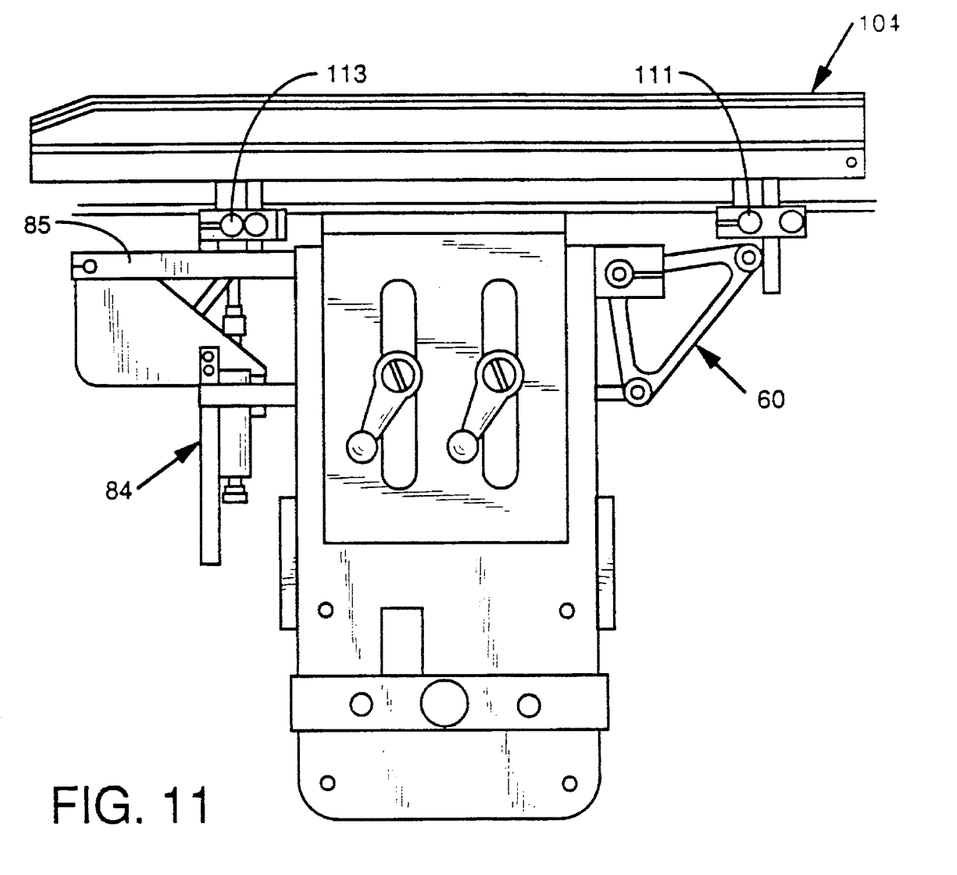
FIG. 11 is a bottom plan view of the apparatus of FIG. 2.

The operator merely needs to enter the diameter of the calibration standard. The electronic processor checks the output signal from the position sensor means 84 and calculates displacements for the particular container position. This permits determination of the thickness correction factor which is required. The electronic microprocessor preferably contains a "look-up" table which contains thickness corrections corresponding to various displacements of the displacement means 84 so that there need not be a new calculation each time. The electronic processor means then applies the correction factor corresponding to a particular measure displacement to correct the thickness measurement and provide an accurate measure of thickness which is independent of the diameter of the particular portion of the non-round annular container being measured. The left and right elevational views, shown respectively in FIGS. 9 and 10, show a jar 110 supported on conveyor 109 and made of a dielectric material in contact with the sensors 52, 100, 102, 104.

Bracket 114 supports the transducer 84 (not shown in this view). As shown in FIGS. 9 and 10, each sensor 52, 100, for example, is operatively associated with oscillator means 120, 124 which have respectively electrical leads 122, 126 which serve to carry the oscillator output voltage which corresponds to container thickness to provide the same to the electronic processor means after passing through an analog-to-digital converter and multiplexer.

Figure 12:
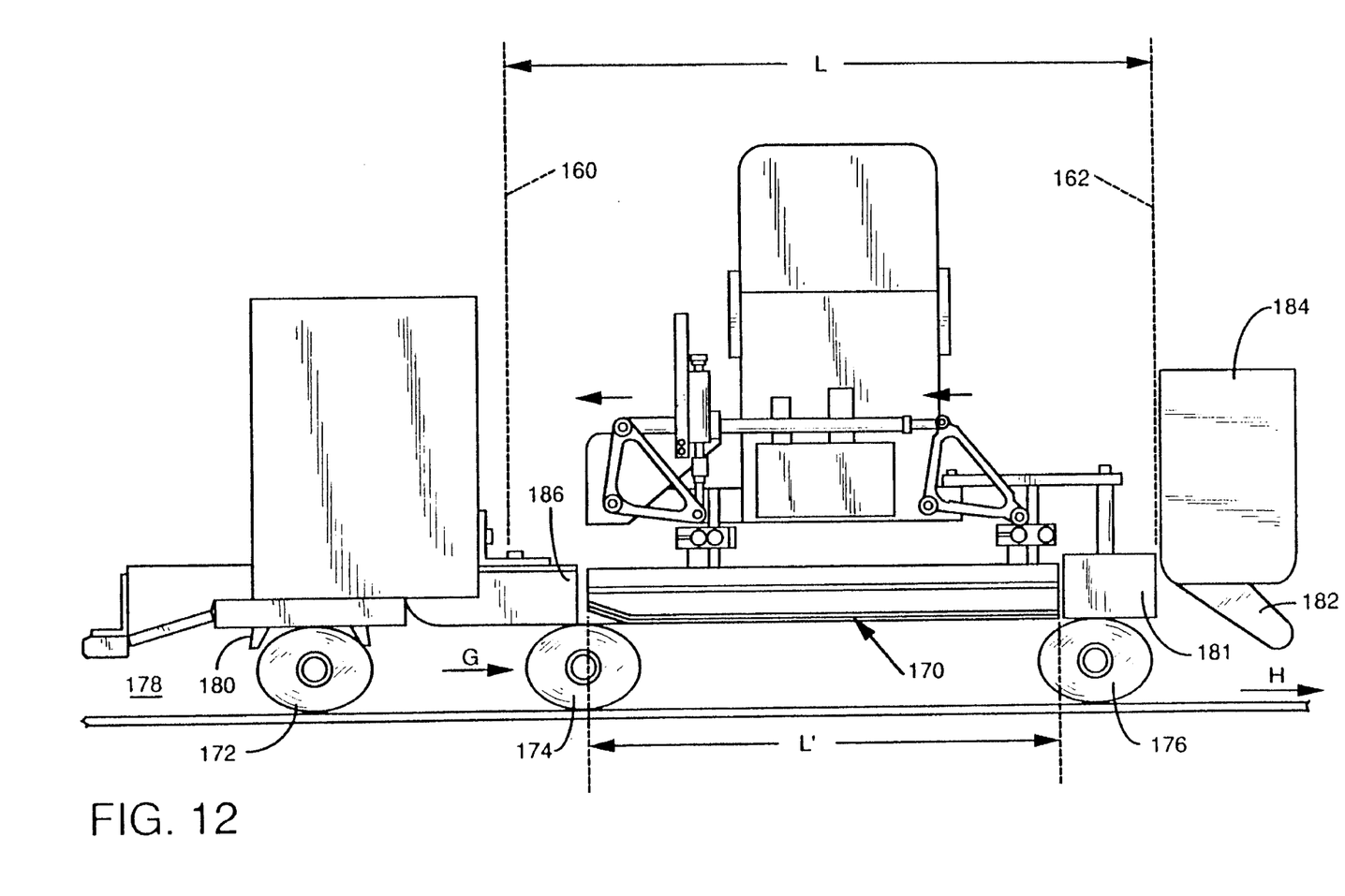
FIG. 12 shows a top plan view of a modified embodiment of the invention employing a sensor of reduced longitudinal extent.

Referring to FIG. 12, a further refinement of the invention will now be considered. In this embodiment, means are provided to enhance the rate at which containers can be inspected. The length of sensor L of the prior embodiment may be considered to extend between the two dashed lines 160, 162 shown in FIG. 12. The length L' of sensor 170 of the embodiment of FIG. 12 is substantially less than that of L. For example, the length of the sensor strip portion of sensor 170 will correspond to the circumference of the portion of the container that it will contact. An additional length which may be about 1½ inches on the upstream end and ½ inch on the downstream end may be provided to take care of the portion of the sensor which extends beyond the sensor strip. In this embodiment, more than one container 172, 174, 176 is on conveyor 178 simultaneously even though only one will be in contact with sensor means 170 at a given time. It will be appreciated that the length L' of sensor 170 is sufficiently long to permit the sensor to inspect the entire circumference of a non-round container 172, 174, 176 which is moving translationally along container 178 and is also being subjected to axial rotation and being urged into intimate contact with the sensor means 170 by means not shown. Star wheel 180 serves to, in time coordinated fashion, release containers for movement on the conveyor in the direction indicated by G. Downstream of the sensor means is container 176 which is in contact with resiliently biased member 181 in order to facilitate efficient movement of the rotating non-round container. Slowdown motor 184 drives two slowdown belts on slowdown arm 182. This serves to reduce the speed of the containers and position the container in the center of conveyor 178 and urge the containers in the direction indicated by arrow H.

In respect of FIG. 12, it will be appreciated that element 181, which facilitates efficient discharge of containers, such as 176 and element 186, which can be resiliently mounted, each operate independently of the sensor means 170 and can thereby facilitate the presence of more than one container in the inspection area at one time, even though only one container would be in contact with the sensor means 170 at a given time. Another advantage of this embodiment, as well as the embodiment of FIG. 13, is that the use of reduced length sensors serve to reduce the mass of the sensors which, in turn, makes them more sensitive to sensor displacement by the containers.

Figure 13:
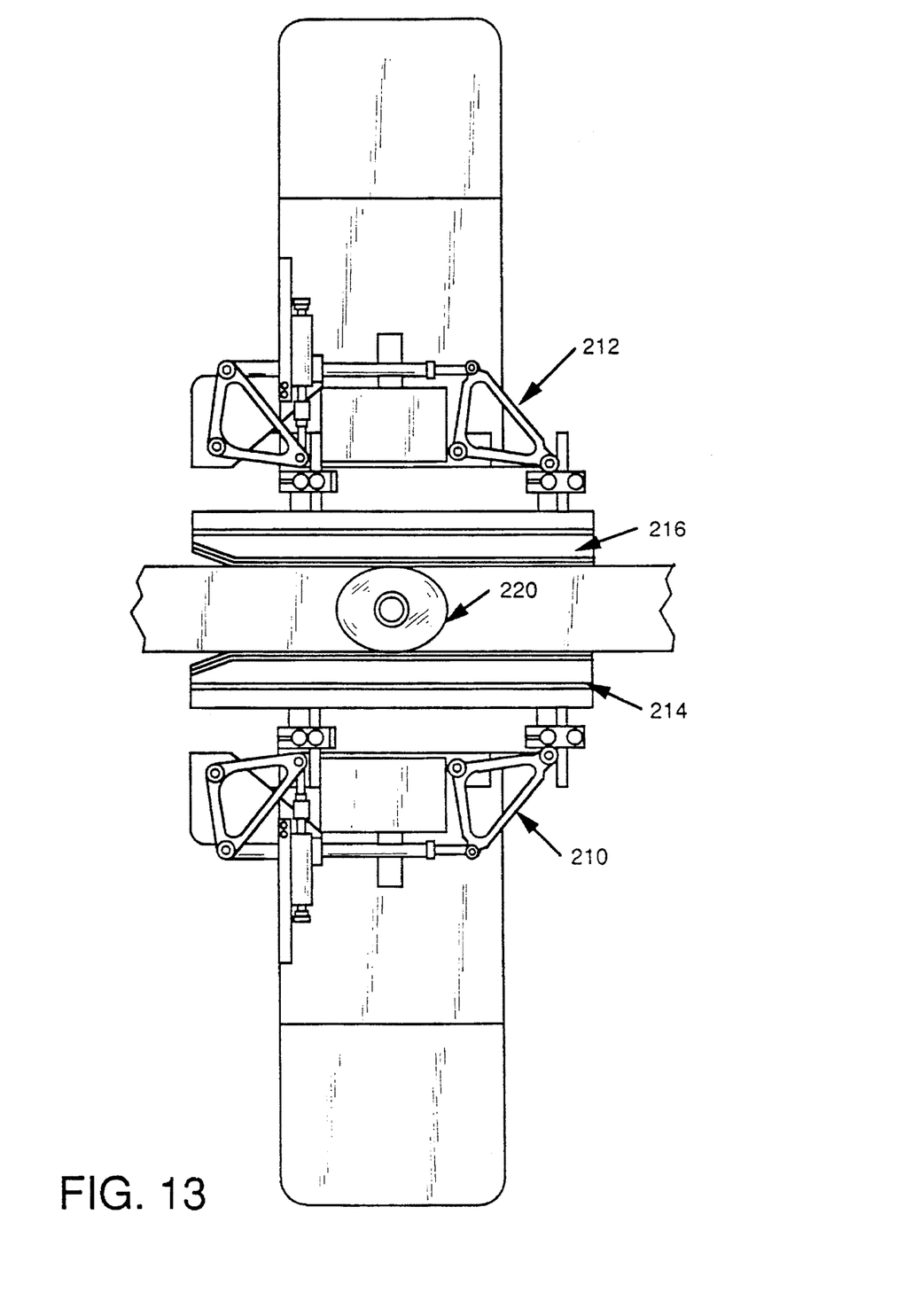
FIG. 13 is a top plan view showing another embodiment of the invention wherein sensor means are provided on both sides of the path of travel of the container.

FIG. 13 shows another embodiment of the invention wherein duplicate inspection assemblies 210, 212 each have, respectively, capacitive sensor means 214, 216 which may consist of a plurality of vertically spaced sensors for inspecting non-round annular container 220. In this manner, each inspection unit 210, 212 may inspect a certain number of circumferential points with the two of them in the aggregate inspecting the number of circumferential points on the container desired to be inspected. The sensor means 214, 216 can be relatively short as each, in principle, need inspect only in the aggregate approximately 180° of the circumference rather than having a single sensor as in the other embodiments inspect substantially the entire circumference.

Figure 14:
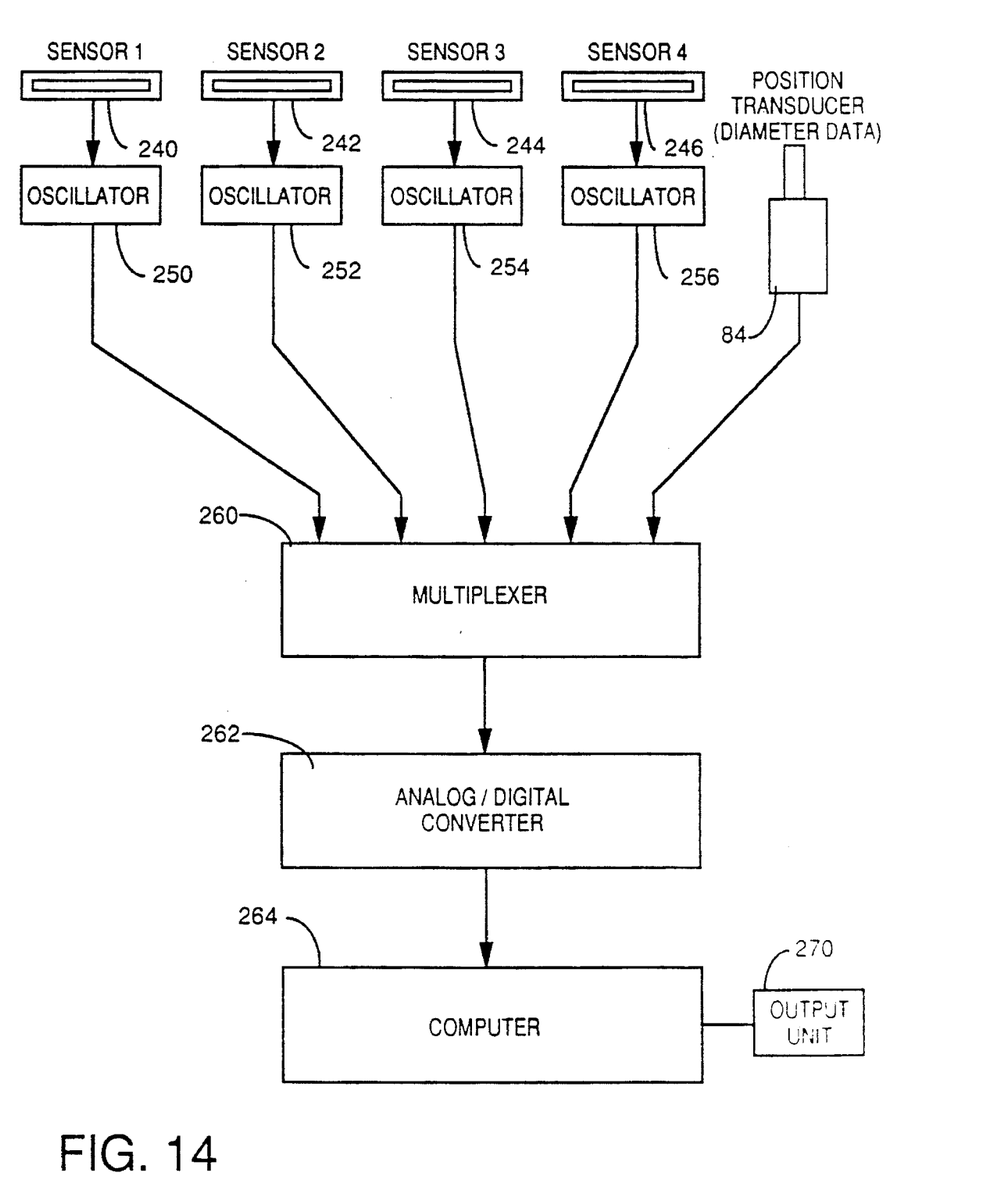
FIG. 14 is a schematic illustration showing the manner in which signals are delivered from various sensors to the electronic processor means.

FIG. 14 illustrates, in general, the sequence of operations in inspecting non-round containers by the present invention. A series of four capacitive sensors 240, 242, 244, 246, all disposed on one side of the path of travel of containers being inspected, have output signals corresponding to the thickness of the portion of the container which has been measured introduced, respectively, into oscillators 250, 252, 254, 256 which produces corresponding voltage signals containing thickness information. All of these voltage signals from the oscillators 250, 252, 254, 256 are introduced into multiplexer 260 from which they are selectively introduced through analog-to-digital converter 262 into the electronic processor means which, in the form shown, is a computer 264. The computer 264, with the assistance of the multiplexer, calculates thickness at the four elevations monitored at each circumferential point being monitored by the sensors 240, 242, 244, 246 as the container is subjected to rotational and translational movement. In addition, the position transducer 84 emits an electrical displacement voltage signal which enters multiplexer 260 and is converted to a digital pulse in analog-to-digital converter 262 and is introduced into the computer 264. The computer contains a look-up table, which for a given diameter calibration previously set by the operator produces a diameter correction factor corresponding to the displacement of each of the sensors 240, 242, 244, 246. The computer 264 the combines the calculated container thickness at a particular point with the adjustment factor and produces a reliable and accurate thickness reading at the position monitored. This signal may be stored in computer 264 or may be delivered to interfacing means 270 so as to provide a hard copy printout, a monitor display or to activate a reject mechanism (not shown), or visual or audible alarm, if desired.

Figure 15:
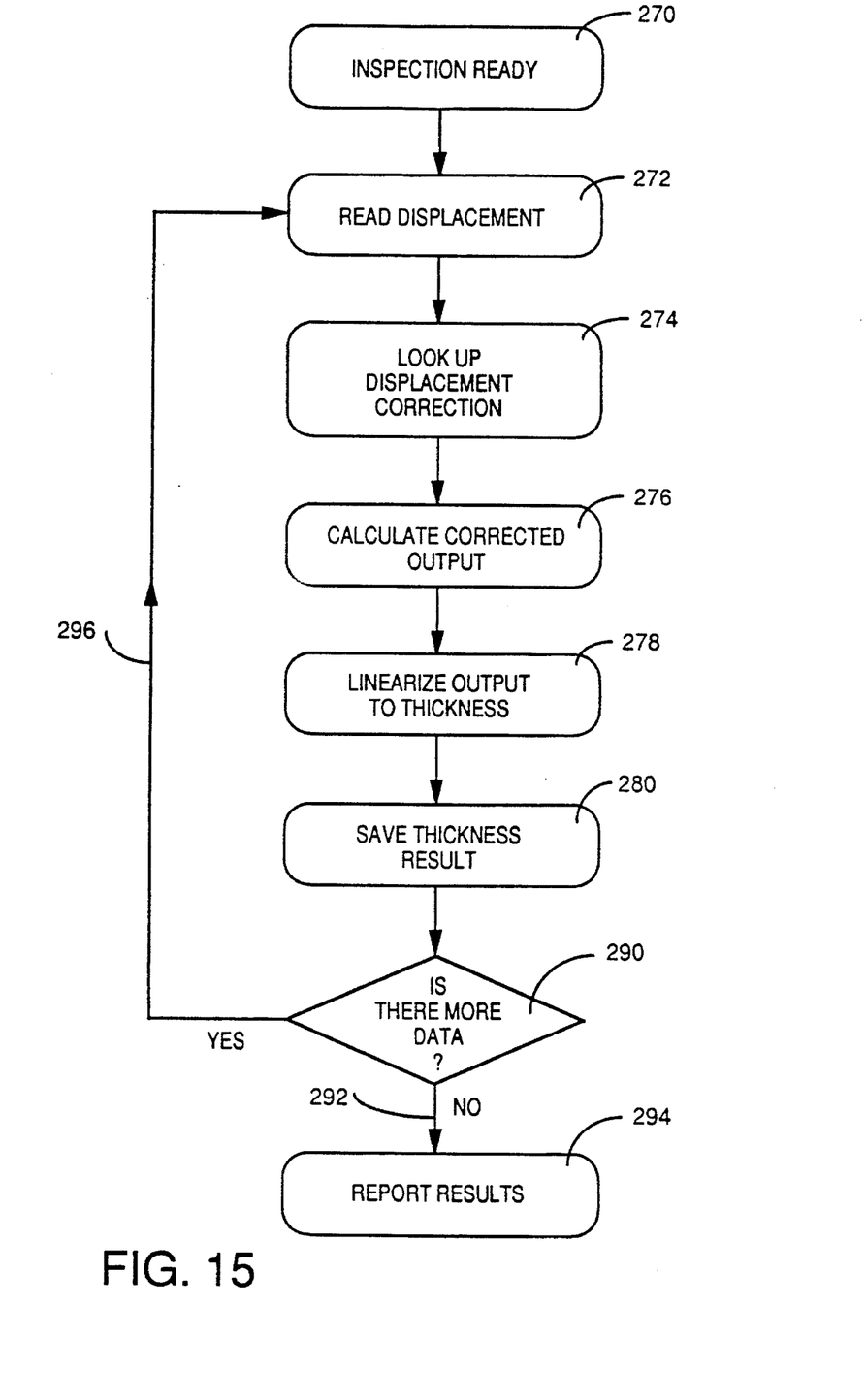
FIG. 15 is a flow chart representative of a preferred practice of the method of the present invention.

Referring to FIG. 15, the method of the present invention will be discussed in greater detail. In referring to FIG. 15, more details of the process of the present invention will be considered. During initial set up, based upon the approximate diameters involved in a non-round annular container a look-up table has been selected based upon the calibration process which is dependent upon the approximate diameter sizes of the container such as the major and minor axes of an oval container. A suitable calibration adjustment for glass or plastic which have different dielectric constants may be made as by adjusting the gain of the circuitry. After inspection has occurred and the voltage signals from the sensor means have been delivered to the electronic processor and compared with the desired thickness readings, a thickness value is determined. Also, the displacement value is received in the electronic processor and is compared with a value in the look-up table to get an appropriate correction value based upon the change in diameter as reflected through the displacement reading. The inspection ready block 270 indicates that the data is available. It is delivered to the read displacement block 272 and the displacement correction 274 is found through comparison with the look-up table. The calculated corrected thickness number 276 is then obtained and the output is linearized 278. The thickness result 280 is then saved. If there is no additional data 290, through line 292, the existing results are reported at 294. If there is additional data, it is delivered over lead 296 to the read displacement block 272 with additional processing occurring at that point. This cycle is continued until the inspection of a given container is completed after which the results may be stored, displayed or employed to automatically reject a container which does not have a thickness within the desired range.

While the preferred embodiment employs a single displaceable element for each array of sensors, if desired, more could be employed.

In another aspect of the invention, the system may be employed with or without thickness measurement to detect variations in diameter of a container which is designed to be round in the region inspected or to provide on-line measurement of container diameter regardless of container shape. The equipment and methods disclosed herein could be employed for such a purpose by employing the diameter voltage signal received from transducer 84 to the electronic processing means 264 for conversion into an absolute diameter or for comparison with a desired diameter and determining the amount of departure therefrom. The diameter information could be stored, enhanced, printed in hard copy, employed to activate a reject mechanism, or employed to provide an on-line monitor display. If desired, the diameter measuring portions of the system could be provided as a separate system directed toward diameter determinations. In such diameter, the sensor means could be substituted for by container contacting means which could be of the same structural configuration as the sensor means, but would not require the capacitive components. In the alternative, one or more elongated container contacting members which would displace the transducer 84 through intermediate linkage means, which could be of the type disclosed, could be employed. For inspection of non-round containers, resilient mounting of the container contacting means should be employed.

It will be appreciated that in some embodiments of the invention, such as that shown in FIG. 13, for example, sensors will be provided on both sides of the path of container travel. This is true regardless of whether one is employing the thickness measurement embodiment or the embodiment which is employed to measure diameter independent of a thickness determination. As is disclosed in connection with FIGS. 7 and 8, resilient means, such as spring 87, are employed to establish relative movement between the sensor means on one side of the path of container travel and either (a) the means for urging the containers into contact with the sensor means, or (b) a second set of sensor means disposed on the opposite side of the path. This relative movement can be established by either movement of sensor means on one side or movement of the container urging means or second sensor of sensor means. In the alternative, movement of both the sensor means on one side of the path and either the (a) container urging means, or (b) second set of sensor means on the other side of the path may be employed to effect such relative movement. This relative movement provides for adjustment of relative spacing to accommodate differences in the containers transverse dimension as a non-round container rotates axially while preserving the desired intimacy of contact with the container.

It will be appreciated that the apparatus and method of the present invention facilitates efficient, rapid reliable inspection at high speed of a large number of non-round containers composed of dielectric material. This is accomplished without having to rely on a sampling technique. The system automatically compensates for changes in diameter of the various portions that sequentially contact the capacitive sensor means. The invention may also be employed to inspect containers for variations in diameter within a container and to provide on-line diameter measurement.

While it will be appreciated that emphasis has been placed herein, for convenience of disclosure, on glass and plastic bottles, the invention is not so limited and may be employed on glass or plastic jars and other containers composed entirely or partially of dielectric material. The choice of material would involve an initial calibration keyed to the material as the glass and plastic, for example, have different dielectric properties, however, the system will function essentially the same once the calibration has been accomplished.

Whereas particular embodiments of the invention have been described above, for purposes of illustration, it will be evident to those skilled in the art that numerous variations of the details may be made without departing from the invention as defined in the appended claims.

We claim:

1. A method of inspecting non-round containers comprising employing capacitive sensor means in contact with said container to emit signals corresponding to changes in capacitance, converting said signals into corresponding capacitive voltage signals, determining the diameter of said container at a plurality of locations by monitoring displacement of said sensor means and emitting displacement voltage signals corresponding thereto, and employing said capacitance voltage signals and said displacement voltage signals to determine the wall thickness of said container at a particular location.

2. The inspection method of claim 1 including repeating said process to determine container wall thickness at a plurality of locations about the circumference of said container.

3. The inspection method of claim 2 including converting said sensor signals into said capacitive voltage signals by oscillator means.

4. The inspection method of claim 3 including employing transducer means to emit a corresponding displacement voltage signal responsive to sensor displacement.

5. The inspection method of claim 4 including comparing said displacement voltage signals with reference values of displacement to determine a diameter related thickness correction factor, and employing said thickness correction factor in determining said wall thickness.

6. The inspection method of claim 5 including monitoring container induced sensor means displacement at a plurality of locations along said sensor with said transducer means being responsive to sensor means displacement at each of said locations.

7. The inspection method of claim 6 including introducing said capacitive voltage signals and said displacement voltage signals into electronic processor means through multiplexer means and an analog-to-digital converter.

8. The inspection method of claim 5 including urging said containers into intimate contact with said sensor means and progressively rotating said containers along said sensor means to cause substantially the entire container circumference to sequentially contact said sensor means.

9. The inspection method of claim 4 including employing mechanical linkage means secured to the opposite side of said sensor means from the side which contacts said container to effect corresponding displacement of said transducer means responsive to displacement of said sensor means by said container.

10. The inspection method of claim 2 including employing said method to inspect generally oval containers.

11. The inspection method of claim 10 including employing said method to inspect elliptical container.

12. The inspection method of claim 9 including employing a plurality of relatively vertically spaced container sensors as said sensor means.

13. The inspection method of claim 2 including employing first said capacitive sensor means on one side of the path of travel of said container and second said capacitive sensor means on the other side of said path, and employing said first sensor means and said second sensor means in a combined manner to effect diameter measurements of said container substantially continuously therearound while requiring rotation of said container for only about 180 degrees.

14. The inspection method of claim 2 including employing as said sensor means an elongated sensor and adjacent independently mounted resilient entry and exit members for facilitating entry of container onto said sensor means and exit of said containers therefrom.

15. The inspection method of claim 8 including altering the spacing between said sensor means and the means for urging said containers into intimate contact therewith while maintaining intimate contact thereof with said containers.

16. The inspection method of claim 15 including employing spring means to effect said altering of space while said containers are rotating axially.

17. The method of claim 8 including resiliently mounting at least one of (a) said sensor means and (b) means for urging said containers into intimate contact therewith.

18. The method of claim 8 including resiliently mounting both (a) said sensor means and (b) said means for urging said containers into intimate contact therewith.

19. The method of claim 13 including resiliently mounting at least one of (a) said first sensor means and (b) said second sensor means.

20. The method of claim 19 including resiliently mounting both (a) said first sensor means and (b) said second sensor means.

* * * * *